(12) United States Patent
Schelstraete (10) Patent No.: US 9,071,299 B1
(45) Date of Patent: Jun. 30, 2015

(54) HDTV COMPATIBLE PRECODING FOR MULTI-USER MIMO IN A WIRELESS HOME NETWORK

(71) Applicant: Quantenna Communications, Inc., Fremont, CA (US)

(72) Inventor: Sigurd Schelstraete, Menlo Park, CA (US)

(73) Assignee: Quantenna Communications Inc., Fremont, CA (US)

( * ) Notice: Subject to any disclaimer, the term of this patent is extended or adjusted under 35 U.S.C. 154(b) by 5 days.

(21) Appl. No.: 14/173,809

(22) Filed: Feb. 5, 2014

Related U.S. Application Data (60) Provisional application No. 61/761,213, filed on Feb. 5, 2013.

(51) Int. Cl.
*H04B 7/02* (2006.01)
*H04B 7/04* (2006.01)

(52) U.S. Cl.
CPC ............ *H04B 7/0456* (2013.01); *H04B 7/0452* (2013.01)

(58) Field of Classification Search
CPC .. H04B 7/0417; H04B 7/0452; H04B 7/0456; H04B 7/046; H04B 7/0469; H04B 7/0473; H04B 7/0486; H04L 25/0204; H04L 25/0224
USPC ......................................................... 375/267
See application file for complete search history.

(56) References Cited

U.S. PATENT DOCUMENTS

| 7,817,745 | B2 | 10/2010 | Cioffi et al. |
| 8,290,539 | B2 | 10/2012 | Li et al. |
| 8,340,601 | B2 | 12/2012 | Gong et al. |
| 8,467,729 | B2 | 6/2013 | Shim et al. |
| 8,472,545 | B2 | 6/2013 | Wu et al. |
| 8,842,760 | B2 * | 9/2014 | Rajagopal et al. ............ 375/260 |
| 2013/0188567 | A1 * | 7/2013 | Wang et al. ................ 370/329 |
| 2014/0369311 | A1 * | 12/2014 | Bi et al. ........................ 370/330 |

OTHER PUBLICATIONS

Sigurd Schelstraete; "An Introduction to 802.11ac" White Paper Quantenna Communications, Inc., Sep. 2011.

(Continued)

*Primary Examiner* — David B. Lugo
(74) *Attorney, Agent, or Firm* — IP Creators; Charles C Cary (57) ABSTRACT

A wireless access point including: a station grouping module for selecting station nodes for concurrent multi-user (MU) multiple-input multiple-output (MIMO) communication links, for retrieving 'sounding' packets therefrom which characterize the associated communication channels; a precode selector for determining whether an aggregate number of receive antennas on the at least two station nodes exceeds in number the plurality of antenna on the WAP; a post-equalization precoder responsive to an affirmative determination by the precode selector to perform a similarity transform of the inner products of the associated communication channels using 'Q' as a transform matrix where 'Q' block diagonalizes the associated communication channels; and a spatial mapper for precoding all concurrent transmissions to the selected at least two station nodes using "Q" as a precode matrix.

17 Claims, 6 Drawing Sheets

MU-MIMO WAP with Post-Equalization Precoding for MU-HDTV support (56) References Cited

OTHER PUBLICATIONS 802.11 Working Group; "IEEE P802.11AC/D1.0 Draft Standard for Information Technololy—Telecommunications and Information Exchange between Systems—Part 11: Wireless LAN Medium Access Control (MAC) and Phycical Layer (PHY) specifications" May 2011.

D.Gesbert,M.Kountouris,R.W.Heath, Jr., C.B.Chae, and T.Salzer, "From Single User to Multiuser Communications: Shifting the MIMO paradigm", IEEE Signal Processing Magazine, Vol, 24, No. 5, pp. 36-46, Oct. 2007.

* cited by examiner

FIG. 1A

PRIOR ART: IEEE 802.11ac Wave 2 MU-MIMO

FIG. 2B  PRIOR ART: Pre-Equalization Precoding Orthogonalizes MU Links using Null Spaces of Respective Channels FIG. 2A  PRIOR ART: 4x4 WAP Multi-User (MU) MIMO FIG. 3B    PRIOR ART: Pre-Equalization Precoding Fails without Null Spaces ( Rx Antennas > Tx Antennas )

FIG. 3A    PRIOR ART:    4x4 WAP Multi-User (MU) MIMO

MU-MIMO WAP with Post-Equalization Precoding for MU-HDTV support

HDTV COMPATIBLE PRECODING FOR MULTI-USER MIMO IN A WIRELESS HOME NETWORK

CROSS REFERENCE TO RELATED APPLICATION

This application claims the benefit of prior filed Provisional Application No. 61/761,213 filed on Feb. 5, 2013 entitled "Method and Apparatus for Multi-User MIMO" which is incorporated herein by reference in its entirety as if fully set forth herein.

BACKGROUND OF THE INVENTION

1. Field of Invention

The field of the present invention relates in general to wireless local area networks including wireless access points (WAP) and wireless stations and methods multi-user concurrent communications with same.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11 ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP.

Initially wireless home networks had limited indoor range and throughput of 20 feet and 1 Mbps respectively. As such they were limited to delivery of data, where inconsistencies in delivery, e.g. temporary outages or throughput shortfalls, are not noticeable. With improvements in range and throughput of 250 feet and 600 Mbps came the possibility of wireless delivery to low latency audio-video streams for consumer devices such as TVs. Each TV requires 5-30 Mbps in uninterrupted throughput for acceptable picture quality.

What is needed are improved methods for multi-user communication on the wireless home network.

SUMMARY OF THE INVENTION

The present invention provides a method and apparatus for a wireless access point (WAP) apparatus to expand multi-user communication groups to include target stations having an aggregate number of receive antenna which exceed the number of antenna on the WAP.

In an embodiment of the invention a WAP having a plurality of antennas and supporting multiple-input multiple-output (MIMO) wireless communications with associated station nodes on a selected one of a plurality of orthogonal frequency division multiplexed (OFDM) communication channels is disclosed. The WAP comprises: a station grouping module, a precode selector, a post-equalization precoder and a spatial mapper. The station grouping module selects at least two of the associated station nodes for concurrent multi-user (MU) MIMO communication links with the WAP and retrieves 'sounding' packets therefrom which characterize the associated communication channels there between. The precode selector determines whether an aggregate number of receive antennas on the at least two station nodes selected by the grouping module exceeds in number the plurality of antenna on the WAP. The post-equalization precoder is responsive to an affirmative determination by the precode selector to determine the inner products of the associated communication channels using the sounding packets and to perform a similarity transform of the inner products using 'Q' as a transform matrix where 'Q' makes selected non-diagonal elements of the transformed matrices equal to zero, a.k.a. block diagonalizes the matrices. The spatial mapper then precodes all concurrent transmissions to the selected station nodes using "Q" as a precode matrix; thereby enhancing the communication capabilities of the WAP.

The invention may be implemented in hardware, firmware or software.

Associated methods and computer readable media containing program instructions are also claimed.

BRIEF DESCRIPTION OF THE DRAWINGS

These and other features and advantages of the present invention will become more apparent to those skilled in the art from the following detailed description in conjunction with the appended drawings in which:

FIG. 7 is a process flow diagram of processes associated with enhanced precoding in the MU MIMO WAP of an embodiment of the current invention.

DETAILED DESCRIPTION OF THE EMBODIMENTS

The present invention provides a method and apparatus for increasing the types of devices that can be included in multi-user (MU) multiple-input multiple-output (MIMO) transmission groups.

Figure 2A:
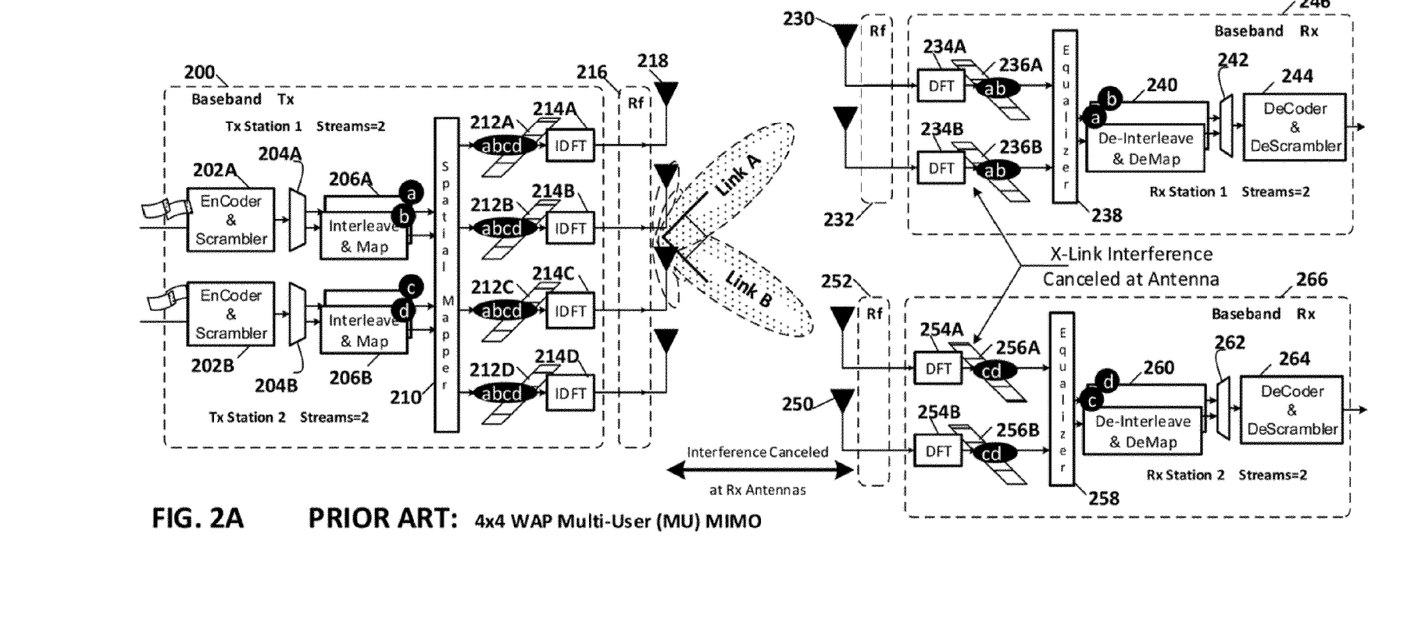
FIGS. 2A-B are respectively a system layout and associated matrix processing view of the Prior Art wireless home network shown in FIGS. 1A-C showing a representative supported MU MIMO group.
Figure 2B:
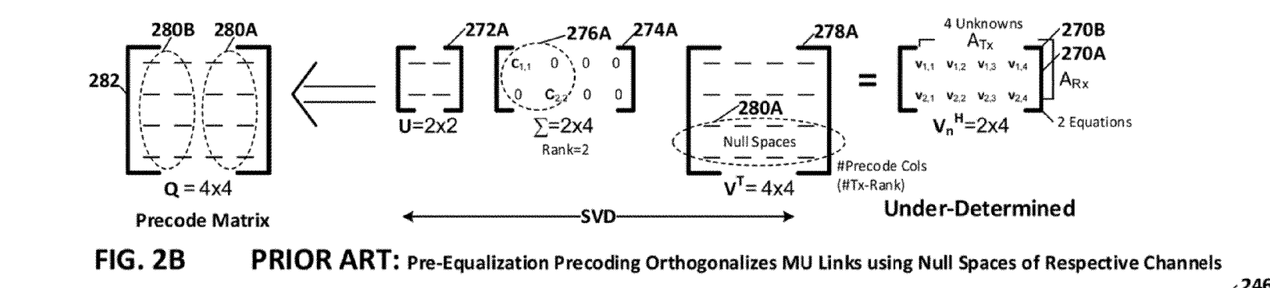
Figure 3A:
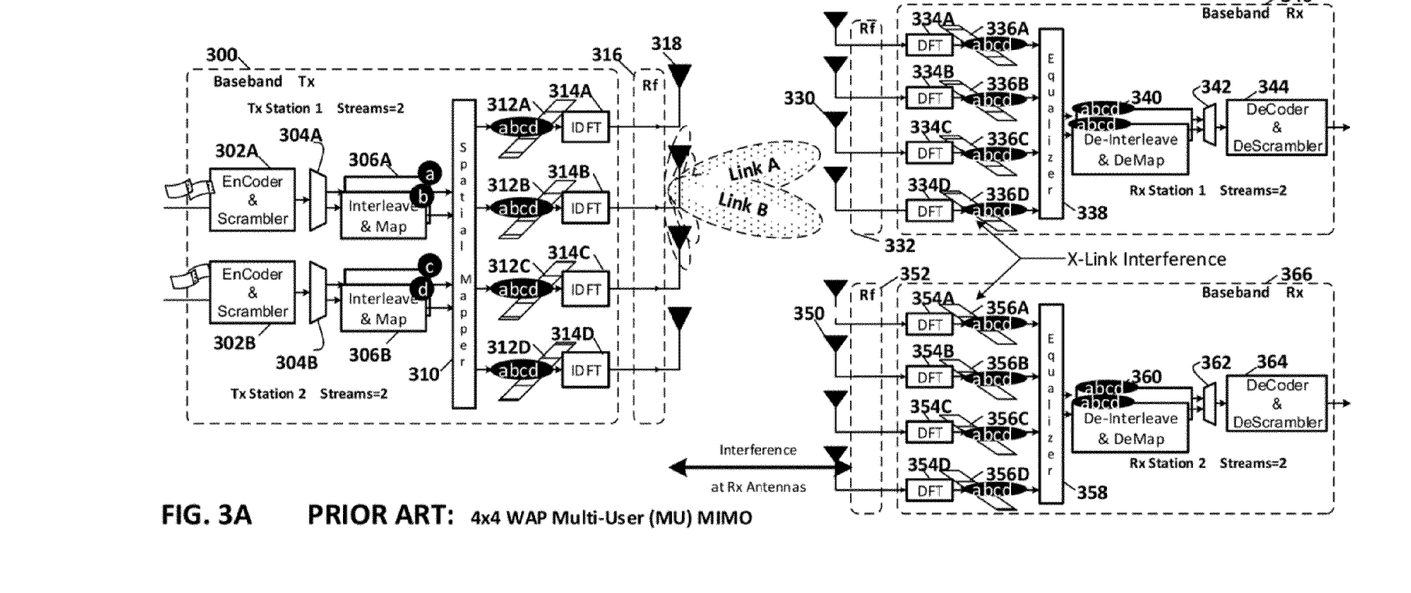
FIGS. 3A-B are respectively a system layout and associated matrix processing view of the Prior Art wireless home network shown in FIGS. 1A-C showing stations which can not be included in MU groups, using Prior Art methods.
Figure 3B:
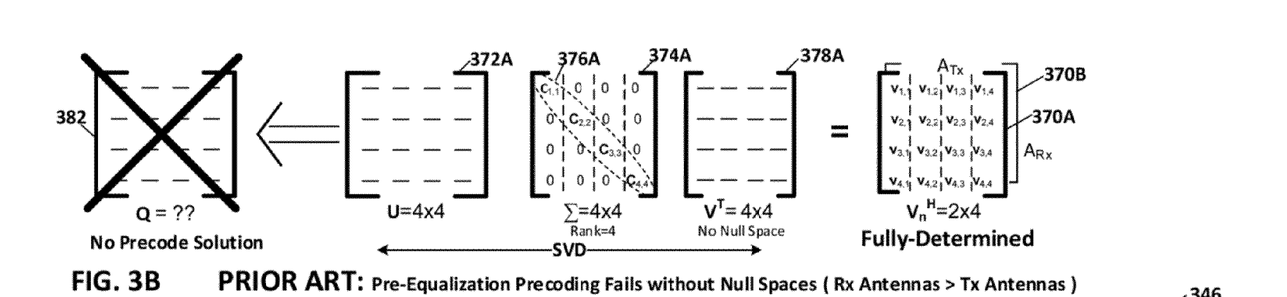

MU-MIMO is a technique whereby multiple independent transmissions are sent simultaneously to a number of receivers. The transmissions are precoded in such a way that the respective receive signals are free of mutual interference. Traditionally, precoding coefficients are chosen in such a way that interference is eliminated at the antennas of the different receivers. However, this technique is subject to stringent constraints on the total number of receive antennas in relation to the total number of transmit antennas. This constraint severely limits the number of users in a multi-user group in cases where the receivers, e.g. wireless: HDTVs, computers and tablets each employ multiple antennas as shown in FIGS. 1-3.

Figures 1A, 1B, 1C:
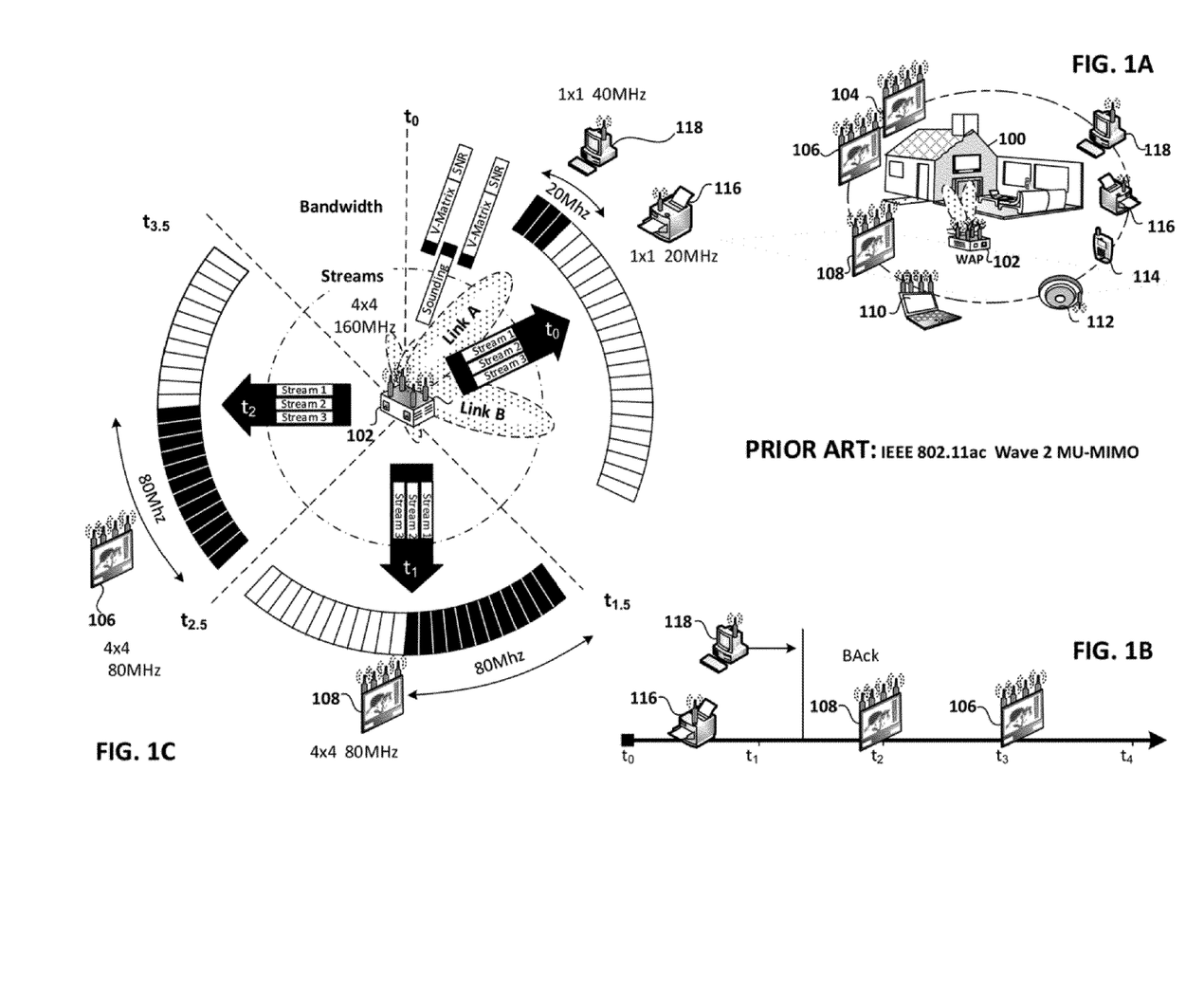
FIGS. 1A-C are respectively a system view, a timing diagram, and a bandplan of a Prior Art wireless home network exhibiting limited support for multi-user (MU) multiple-input multiple-output (MIMO) wireless communications.

FIGS. 1A-C are respectively a system view, a timing diagram, and a bandplan of a Prior Art wireless home network exhibiting limited support for MU MIMO wireless communications. Prior Art MU MIMO as implemented in the IEEE 802.11ac standard and specifically 'Wave 2' thereof, is intended to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP 102. This prior art case is shown in FIG. 1A-C. FIG. 1A is a system view of a plurality of single antenna stations: 112, 114, 116, 118 and a plurality of multi-antenna stations: 104, 106, 108, 110 serviced by WAP 102 in home 100.

As shown in FIG. 1B any 802.11ac compliant single antenna devices can be aggregated into MU groups with some concomitant reduction in WAP airtime resulting from the ability of the WAP to concurrently transmit discrete data to two or more of such devices in an MU group. In FIG. 18B WAP is shown transmitting concurrent discrete communications to printer 116 and computer 118 in the same time interval, followed by discrete single link serial communications to HDTVs 108 and 106 in subsequent intervals.

FIG. 1C shows the bandwidth and streams and time intervals associated with the multi-user group of single antenna single stream devices 116 and 118 followed by serial communications in successive time intervals to HDTVs 108 and 106. Any devices participating in a multi-user group are subject to an initial channel sounding from the WAP and response from each targeted user device in which indicia for the associated channel are returned, i.e. the V-Matrix and Signal-to-Noise Ratios (SNR). Representative communication capabilities for each device including the WAP are shown. The WAP supports up to a 160 MHz bandwidth using 4 antennas to transmit/receive up to four communication streams. Each HDTV supports up to 80 MHz bandwidth using 4 antennas to transmit up to 4 communication streams. The computer supports up to 40 MHz bandwidth using 1 antenna to transmit/receive 1 communication stream. The printer only supports 20 MHz bandwidth using 1 antenna to transmit/receive 1 communication stream. Therefore the MU bandwidth for the single MU group including computer 118 and printer 116 is 20 MHz.

Pre-Equalization Precoding:

In the prior art approach to precoding the design criteria for $Q_i$ is such that the received signals are free of interference at the receive antenna of the corresponding device, and hence before any equalization has been performed in the baseband portion of the receiver. This precoding approach will be referred to as pre-equalization precoding. In this prior art approach an MU precoded transmission for three users can be written as:

$$Tx = Q_1 X_1 + Q_2 X_2 + Q_3 X_3 \quad (1)$$

where $Q_i$ are the pre-equalization precoding coefficients and $X_i$ represents the data for $i^{th}$ user.

The pre-equalized precoded signal as received at each of the receivers is expressed as:

$$Rx_1 = H_1(Q_1 X_1 + Q_2 X_2 + Q_3 X_3)$$

$$Rx_2 = H_2(Q_1 X_1 + Q_2 X_2 + Q_3 X_3) \quad (2)$$

$$Rx_3 = H_3(Q_1 X_1 + Q_2 X_2 + Q_3 X_3)$$

The design criteria for $Q_i$ in the Prior Art is such that the received signals are free of interference at the respective antenna(s) of each station. In (2) for instance, $Rx_1$ (received signal for user 1) contains terms $H_1 Q_2 X_2$ and $H_1 Q_3 X_3$, which represent interference from the second and third user. The condition for eliminating the interference for user 1 is to choose $Q_i$ such that $H_1 Q_2 = H_1 Q_3 = 0$.

To cancel all mutual interference, the prior art pre-equalization constraints on $Q_i$, the $i^{th}$ column of Q are that:

$$H_1 Q_2 = H_1 Q_3 = 0$$

$$H_2 Q_1 = H_2 Q_3 = 0$$

$$H_3 Q_1 = H_3 Q_2 = 0 \quad (3)$$

In such a case, the received signal at the first receiver does not contain any contribution from the signals intended for STA2 and STA3. Likewise, the received signal at the second receiver does not contain any contribution from the signals intended for STA1 and STA3 and the received signal at the third receiver does not contain any contribution from the signals intended for STA1 and STA2.

The main challenge is the construction of suitable precoding coefficients $Q_i$ that actually meet the conditions. One well-known technique is based on the existence of null-spaces for the respective channels. A null space of a matrix is the ensemble of vectors that is mapped to zero when multiplied with the matrix. In other words, a vector $X \neq 0$ is in the null space of the matrix M if $M \cdot X = 0$.

These constraints may alternately be expressed in terms of the channel indicia received from each station eligible for a MU group. Given the SVD decomposition for each of the channels: $H_i = U_i \Sigma_i V_i^+$, (3) is equivalent to:

$$V_1^+ Q_2 = V_1^+ Q_3 = 0$$

$$V_2^+ Q_1 = V_2^+ Q_3 = 0$$

$$V_3^+ Q_1 = V_3^+ Q_2 = 0 \quad (4)$$

where the '+' operator is the conjugate transpose, a.k.a. Hermitian. Only the V-matrix in the channel sounding response packet from each station in the MU group is needed to solve these equations.

Equations (4) can be re-written as:

$$\begin{bmatrix} V_2^+ \\ V_3^+ \end{bmatrix} Q_1 = 0 \tag{5}$$

$$\begin{bmatrix} V_1^+ \\ V_3^+ \end{bmatrix} Q_2 = 0$$

$$\begin{bmatrix} V_1^+ \\ V_2^+ \end{bmatrix} Q_3 = 0$$

In other words:
The solution for $Q_1$ lies in the null space of the matrix $$\begin{bmatrix} V_2^+ \\ V_3^+ \end{bmatrix}$$

The solution for $Q_2$ lies in the null space of the matrix $$\begin{bmatrix} V_1^+ \\ V_3^+ \end{bmatrix}$$

The solution for $Q_3$ lies in the null space of the matrix $$\begin{bmatrix} V_1^+ \\ V_2^+ \end{bmatrix}$$

The null spaces can be found by the transmitter by performing an SVD on each of the matrices and selecting the columns of "V" that correspond to null spaces.

Such a solution can be found, but is subject to one important constraint, namely that the total number of receive antennas does not exceed the total number of transmit antennas:

$$\sum_{i=1}^{N_{user}} N_{RX_i} \leq N_{TX} \tag{6}$$

Only when this condition is met, is the existence of a null space with the right dimensions guaranteed.

Example with Pre-Equalization Precoding Using Null Space:

Consider a transmitter with four transmit antennas ($N_{TX}$=4) sending to three receivers, each with a single received antenna ($N_{RX_1}=N_{RX_2}=N_{RX_3}=1$). Each of the channels is a 1×4 vector. For instance:

$H_1$=[−1.506 −0.4446 −0.1559 0.2761]

$H_2$=[−0.2612 0.4434 0.3919 −1.2507]

$H_3$=[−0.9480 −0.7411 −0.5078 −0.3206]  (7)

In keeping with the goal of designing precoding coefficients that fall in the null spaces of the other users' channels, we choose $Q_1$ to be in the null space of:

$$\begin{bmatrix} H_2 \\ H_3 \end{bmatrix} = \begin{bmatrix} -0.2612 & 0.4434 & 0.3919 & -1.2507 \\ -0.9480 & -0.7411 & -0.5078 & -0.3206 \end{bmatrix} \tag{8}$$

A possible solution which can be found using a singular value decomposition (SVD) is given by:

$$Q_1 = \begin{bmatrix} -0.0430 \\ -0.5478 \\ 0.8321 \\ 0.0755 \end{bmatrix} \tag{9}$$

Further, we choose $Q_2$ to be in the null space of:

$$\begin{bmatrix} H_1 \\ H_3 \end{bmatrix} = \begin{bmatrix} -1.506 & -0.4446 & -0.1559 & 0.2761 \\ -0.9480 & -0.7411 & -0.5078 & -0.3206 \end{bmatrix} \tag{10}$$

and $Q_3$ to be in the null space of:

$$\begin{bmatrix} H_1 \\ H_2 \end{bmatrix} = \begin{bmatrix} -1.506 & -0.4446 & -0.1559 & 0.2761 \\ -0.2612 & 0.4434 & 0.3919 & -1.2507 \end{bmatrix} \tag{11}$$

Possible solutions are:

$$Q_2 = \begin{bmatrix} 0.0262 \\ -0.5120 \\ 0.8320 \\ -0.2117 \end{bmatrix} \tag{42}$$

and $$Q_3 = \begin{bmatrix} 0.0206 \\ -0.2812 \\ 0.9403 \\ 0.1906 \end{bmatrix} \tag{53}$$

One can easily verify that the precoding conditions are met with this choice of pre-equalizer precoding coefficients.

With that, the received signals are given by:

$Rx_1 = H_1 Q_1 X_1$ $Rx_2 = H_2 Q_2 X_2$ $Rx_3 = H_3 Q_3 X_3$  (14)

Each of the receivers only needs to perform equalization of its received signal, without any consideration of the other signals that were present at the transmitter. All signals are received free of interference at the antennas and before equalization.

FIGS. 2A-B are respectively a system layout and associated matrix processing view of the Prior Art wireless home network shown in FIGS. 1A-C showing a representative supported MU MIMO group where the aggregate number of receive antennas in the devices/stations which are intended to form the multi-user group is less than or equal to the number of transmit antennas on the WAP 200.

FIG. 2A shows WAP 200 transmitting concurrently to an MU group comprising stations 246 and 266. The WAP has 4 antenna 218, and each station has two antenna 230 for station 246 and 250 for station 266. In WAP 200 communications for user/station 246 are encoded and scrambled in encoder scrambler module 202A and de-multiplexed into two streams in demultiplexer 204A. Each stream "a", "b" is subject to interleaving and constellation mapping in an associated interleaver mapper 206A and passed to the spatial mapper 210. Communications for user/station 266 are encoded and scrambled in encoder scrambler module 202B and de-multiplexed into two streams in demultiplexer 2048. Each stream "c", "d" is subject to interleaving and constellation mapping in an associated interleaver mapper 206B and passed to the spatial mapper 210. The spatial mapper uses pre-equalization precoding matrix to precode the two pairs of streams for each user so that they will arrive at their target stations antennas without interference from one another. The combined precoded streams are injected into all OFDM tones 212A-D of the four inverse discrete Fourier Transform (IDFT) modules 214A-D respectively for Radio Frequency (Rf) upconversion in Rf stage 216 and for transmission by each of the WAP's four antenna 218.

The signals received at the antenna 230 of station 246 are free from interference from the communications to station 266 and vice versa. In station 246 the received communications "ab" on each of the two antenna are downconverted in Rf stage 232 and transformed from the time to the frequency domain in discrete Fourier Transform modules 234A-B from which they are output as discrete orthogonal frequency division multiplexed (OFDM) tones/sub-carriers/sub-channels 236A-B. All received streams are then subject to equalization in equalizer 238 implementing either linear or non-linear equalization. Received steams "ab" are subject to de-interleaving and constellation demapping in associated deinterleaver demapper modules 240, followed by multiplexing in multiplexer 242. The received data "ab" is decoded and descrambled in decoder descrambler 244.

The signals received at the antenna 250 of station 266 are also free from interference from the communications to station 246. In station 266 the received communications "cd" on each of the two antenna are downconverted in Rf stage 252 and transformed from the time to the frequency domain in discrete Fourier Transform modules 254A-B from which they are output as discrete orthogonal frequency division multiplexed (OFDM) tones/sub-carriers/sub-channels 256A-B. All received streams are then subject to equalization in equalizer 258 implementing either linear or non-linear equalization. Received steams "cd" are subject to de-interleaving and constellation demapping in associated deinterleaver demapper modules 260, followed by multiplexing in multiplexer 262. The received data "cd" is decoded and descrambled in decoder descrambler 264.

As shown in FIG. 2B the WAP 200 calculates the precode matrix used in the spatial mapper 210 using the "$V^H$" matrix 270A, 270B in the responsive sounding packets. The matrices received in each sounding packet are said to be under-determined since the number of unknowns exceeds the number of equations. Pre-equalization precoding as practiced by the prior art works in this scenario. The WAP performs a singular value decomposition (SVD) of each matrix and extracts the corresponding column of the pre-equalization precode matrix from therefrom. For example when an SVD is performed on "$V^H$" matrix 270A the $U\Sigma V^T$ matrices 272A, 274A, 278A respectively are obtained. Sigma has a rank of 2 with non-zero diagonal terms 276 on the first two columns only. The null spaces in V transpose correspond to the last two rows 280A thereof. After transpose these become the associated columns 280A of the pre-equalization precode matrix 282. The remaining columns of the pre-equalization precode matrix result from a similar SVD on the other station's "$V^H$" matrix 2708.

FIGS. 3A-B are respectively a system layout and associated matrix processing view of the Prior Art wireless home network shown in FIGS. 1A-C showing stations which can not be included in MU groups, using Prior Art methods because the aggregate number of receive antennas in the devices/stations which are intended to form the multi-user group are greater than the number of transmit antennas on the WAP 300.

FIG. 3A shows WAP 300 transmitting concurrently to an MU group comprising stations 346 and 366. The WAP has 4 antenna 318, and each station also has four antenna 330 for station 346 and 350 for station 366. In WAP 300 communications for user/station 346 are encoded and scrambled in encoder scrambler module 302A and de-multiplexed into two streams in demultiplexer 304A. Each stream "a", "b" is subject to interleaving and constellation mapping in an associated interleaver mapper 306A and passed to the spatial mapper 310. Communications for user/station 366 are encoded and scrambled in encoder scrambler module 302B and de-multiplexed into two streams in demultiplexer 304B. Each stream "c", "d" is subject to interleaving and constellation mapping in an associated interleaver mapper 306B and passed to the spatial mapper 310. The spatial mapper uses pre-equalization precoding matrix to precode the two pairs of streams for each user so that they will arrive at their target stations antennas without interference from one another. The combined precoded streams are injected into all OFDM tones 312A-D of the four inverse discrete Fourier Transform (IDFT) modules 314A-D respectively for Radio Frequency (Rf) upconversion in Rf stage 316 and for transmission by each of the WAP's four antenna 318.

The signals received at the four antenna 330 of station 346 are not free from interference from the communications to station 366, because the aggregate number of receive antennas exceeds the number of transmit antennas, thus removing null spaces from the SVD solution space. As a result in station 346 the received communications include contributions from both user's streams "abcd" on each of the four antenna. These contributions/interference remain after downconversion in Rf stage 332 and transformation from the time to the frequency domain in discrete Fourier Transform modules 334A-D from which these mixed streams are output as discrete orthogonal frequency division multiplexed (OFDM) tones/sub-carriers/sub-channels 336A-D each of which exhibits such interference. All received streams are then subject to equalization in equalizer 338 implementing either linear or non-linear equalization which does not remove the cross user interference. As a result received steams "abcd" are subject to de-interleaving and constellation demapping in associated deinterleaver demapper modules 340, followed by multiplexing in multiplexer 342. The received data "abcd" is garbled both before and after decoding and descrambling in decoder descrambler 244.

The signals received at the antenna 350 of station 366 also show interference from the communications to station 346. In station 366 the received communications "abcd" on each of the four antenna are downconverted in Rf stage 352 and transformed from the time to the frequency domain in discrete Fourier Transform modules 354A-D from which they are output as discrete orthogonal frequency division multiplexed (OFDM) tones/sub-carriers/sub-channels 356A-D. All received streams are then subject to equalization in equalizer 358 implementing either linear or non-linear equalization. Received steams still contain cross-user interference "abcd" and are subject to de-interleaving and constellation demapping in associated deinterleaver demapper modules 360, followed by multiplexing in multiplexer 362. The received data "abcd" is garbled or corrupted after decoding and descrambling in decoder descrambler 364.

As shown in FIG. 3B the WAP 300 calculates the precode matrix used in the spatial mapper 310 using the "$V^H$" matrix 370A, 370B in the responsive sounding packets from stations 346, 366. The matrices received in each sounding packet are said to be fully-determined since the number of unknowns equals the number of equations. Thus when the WAP attempts to calculate the precode matrix using the SVD according to the prior art technique, there is no null space in $V^T$ from which to extract a precode matrix column value. For example when an SVD is performed on "$V^H$" matrix 370A the $U\Sigma V^T$ matrices 372A, 374A, 378A respectively are obtained. Sigma has a rank of 4 with non-zero diagonal terms across all columns 376. There are no null spaces in V transpose. Thus the precode matrix 382 can not be determined.

Post-Equalization Precoding:

The MU-MIMO WAP of the current invention includes support for multi-user groups in which group members such as wireless HDTVs, computers and tablets with communication capabilities rivaling those of the WAP may be concurrently serviced. This capability arises from what will be identified as post-equalization precoding. This nomenclature arises from the fact that post-equalization precoding does not cancel interference from other users at the receive antennas of each user/station in the group, but rather after linear or non-linear equalization by the corresponding equalizer of each receiving station in the MU group. By designing a precoding that considers the interference after the equalizer, the constraints that limit the existing methods no longer apply. In particular, it becomes possible to perform MU-MIMO for cases where $$\sum_{i=1}^{N_{user}} N_{RX_i} > N_{TX} \tag{15}$$

For STAs with multiple antennas, the number of streams in the transmission is typically lower than the number of antennas. What counts then is not so much removing interference from the received signal (i.e. the signal at the antennas) as removing interference from the received streams (i.e. the signal after equalization)

In addition, we wish to achieve this without cooperation from the receivers, meaning that the precoding will remove interference even if the receiver is oblivious to the fact that an interfering signal is present at the antennas or has no means to actively eliminate this interference. In effect, for all practical purposes, each receiver will act as a single-user receiver. The onus of removing the interference falls on the transmitter that has to calculate the appropriate linear precoding coefficients. Note that a receiver with excess antennas could actively participate in removing the interference, but we will make no assumptions about whether or not this capability is present.

Figure 4A:
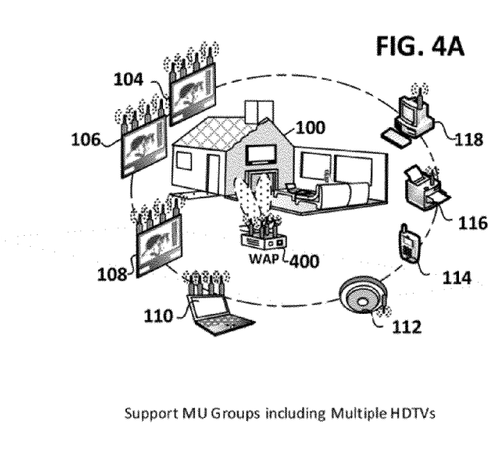
FIGS. 4A-C are respectively a system view, a timing diagram, and a bandplan of a wireless home network in accordance with an embodiment of the invention which expands the types of stations which can be included in MU MIMO groups including wireless HDTVs for example.
Figure 4B:
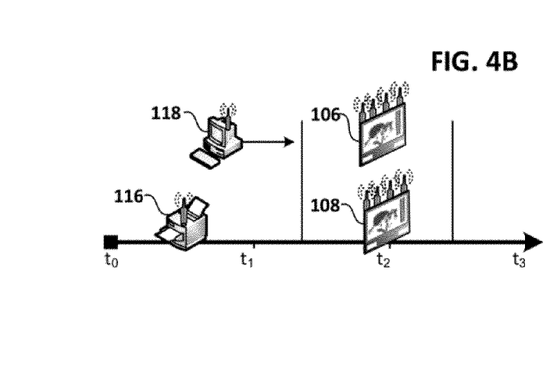
Figure 4C:
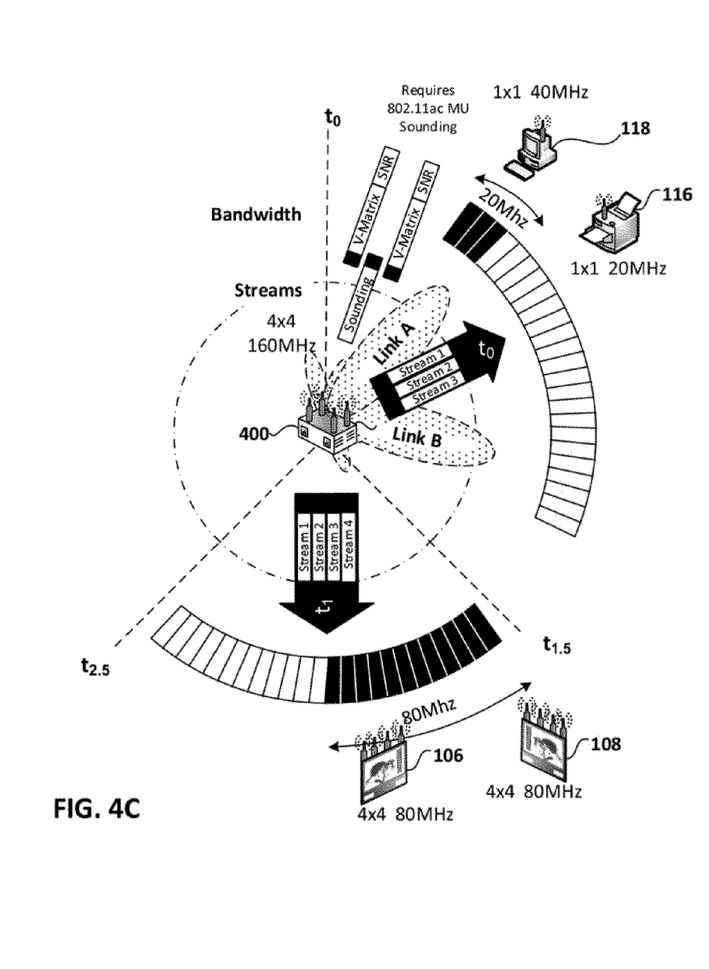

FIGS. 4A-C are respectively a system view, a timing diagram, and a bandplan of a wireless home network in accordance with an embodiment of the invention which expands the types of stations which can be included in MU MIMO groups to include wireless: HDTVs, computers and tablets with communication capabilities comparable to the WAP. In contrast to the prior art MU case shown in FIGS. 1A-C the WAP 400 with enhanced precoding support shown in this embodiment of the invention can form multi-user groups from a broader and more capable set of wireless devices. In addition to forming MU groups with multiple single antenna single stream devices concurrently, the WAP of the current invention can also form concurrent discrete MU links with multiple high throughput wireless devices demanding discrete high definition video streams. FIG. 4A is a system view of a plurality of single antenna stations: 112, 114, 116, 118 and a plurality of multi-antenna stations: 104, 106, 108, 110 serviced by WAP 102 in home 100.

As shown in FIG. 4B either or both 802.11ac compliant single antenna devices and multi-antenna devices can be aggregated into MU groups with some concomitant reduction in WAP airtime resulting from the ability of the WAP to concurrently transmit discrete data to two or more of such devices in an MU group. In FIG. 4B WAP is shown transmitting concurrent discrete communications to printer 116 and computer 118 in the same time interval, followed by concurrent discrete communications to HDTVs 108 and 106 in a subsequent interval which includes an associated channel sounding and response from the targeted devices.

FIG. 4C shows the bandwidth and streams and time intervals associated with the multi-user group of single antenna single stream devices 116 and 118 followed by a second multi-user group to multi-antenna devices, e.g. HDTVs 108 and 106 in a subsequent interval. This second MU group has HDTVs the aggregate number of antennas of which exceeds the number of transmit antenna on the WAP. By means of the post-equalization method of the current invention these wireless devices can also be included in MU groups. Any devices participating in a multi-user group are subject to an initial channel sounding from the WAP and response from each targeted user device in which indicia for the associated channel are returned, i.e. the V-Matrix and Signal-to-Noise Ratios (SNR). There is one sounding for the first MU group, and a second channel sounding and response for the second MU group. Representative communication capabilities for each device including the WAP are shown. The WAP supports up to a 160 MHz bandwidth using 4 antennas to transmit/receive up to four communication streams. Each HDTV supports up to 80 MHz bandwidth using 4 antennas to transmit up to 4 communication streams. The computer supports up to 40 MHz bandwidth using 1 antenna to transmit/receive 1 communication stream. The printer only supports 20 MHz bandwidth using 1 antenna to transmit/receive 1 communication stream. The MU bandwidth for the first MU group including computer 118 and printer 116 is 20 MHz. The MU bandwidth for the second MU group including HDTVs 106, 108 is 80 MHz.

Figure 5A:
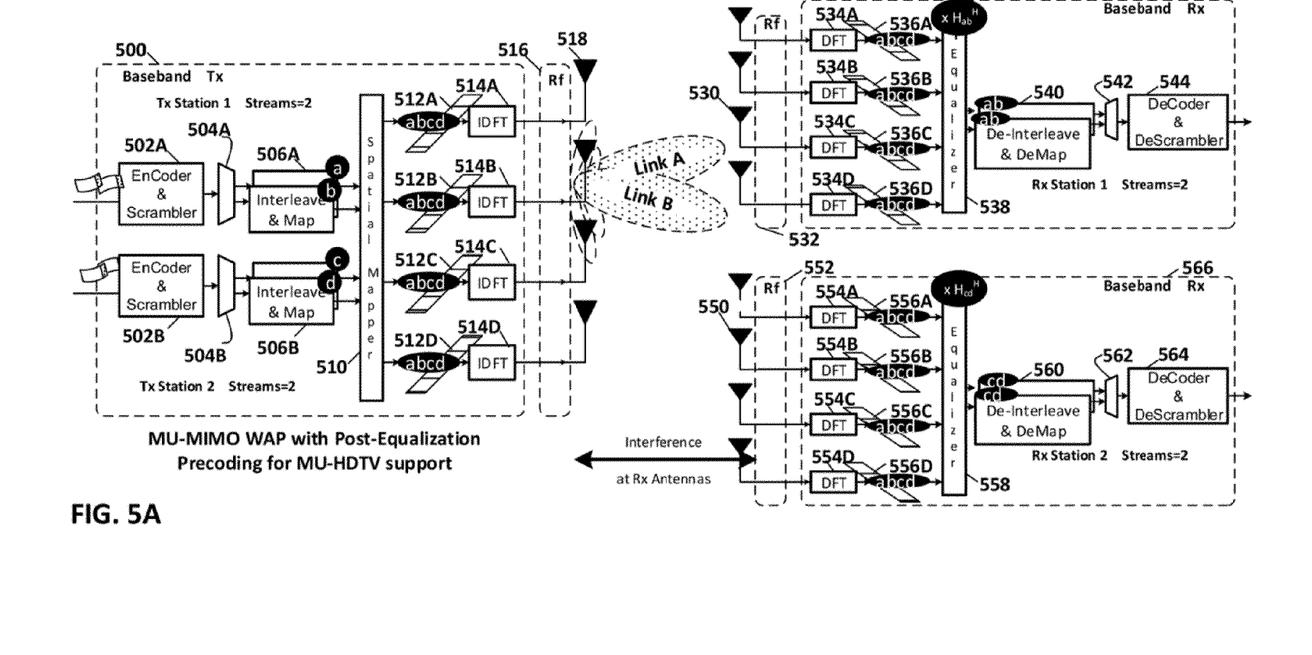
FIGS. 5A-B are respectively a system layout and associated matrix processing view of an embodiment of the invention which allows wireless HDTVs to be included in MU MIMO groups.
Figure 5B:
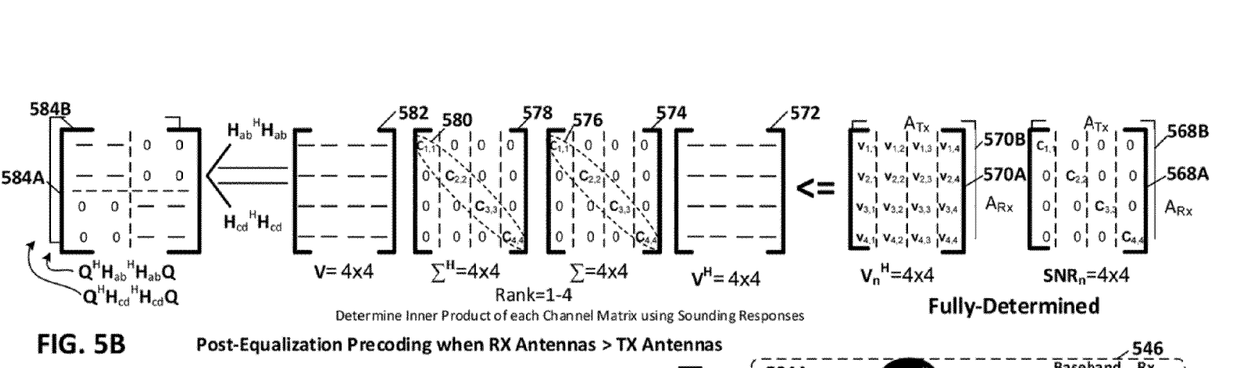

FIGS. 5A-B are respectively a system layout and associated matrix processing view of an embodiment of the invention which allows wireless HDTVs and other types of high throughput devices with communication capabilities matching that of the WAP to be included in MU MIMO groups. Post-Equalization precoding is used to precode communications for MU groups in which the aggregate number of receive antennas in the devices/stations which are intended to form the multi-user group are greater than the number of transmit antennas on the WAP 500.

FIG. 5A shows WAP 500 transmitting concurrently to an MU group comprising stations 546 and 566. The WAP has 4 antenna 518, and each station also has four antenna 530 for station 546 and 550 for station 566. In WAP 500 communications for user/station 546 are encoded and scrambled in encoder scrambler module 502A and de-multiplexed into two streams in demultiplexer 504A. Each stream "a", "b" is subject to interleaving and constellation mapping in an associated interleaver mapper 506A and passed to the spatial mapper 510. Communications for user/station 566 are encoded and scrambled in encoder scrambler module 502B and demultiplexed into two streams in demultiplexer 504B. Each stream "c", "d" is subject to interleaving and constellation mapping in an associated interleaver mapper 506B and passed to the spatial mapper 510. The spatial mapper in this embodiment of the invention supports a post-equalization precoding matrix to precode the two pairs of streams for each user so that they will arrive at their target stations antennas with identified interference from one another which will be removed by the associated equalizer during receive processing. The combined precoded streams are injected into all OFDM tones 512A-D of the four inverse discrete Fourier Transform (IDFT) modules 514A-D respectively for Radio Frequency (Rf) upconversion in Rf stage 516 and for transmission by each of the WAP's four antenna 518.

The signals received at the four antenna 530 of station 546 exhibit known amounts of interference from the communications to station 566, which will be removed during the linear or non-linear equalization performed in equalizer 538. As a result in station 546 the received communications include contributions from both user's streams "abcd" on each of the four antenna. These contributions/interference remain after downconversion in Rf stage 532 and transformation from the time to the frequency domain in discrete Fourier Transform modules 534A-D from which these mixed streams are output as discrete orthogonal frequency division multiplexed (OFDM) tones/sub-carriers/sub-channels 536A-D each of which continues to exhibit such interference. All received streams are then subject to equalization in equalizer 538 implementing either linear or non-linear equalization which removes the cross user interference due to the novel post-equalization precoding of the current invention. At the output of the equalizer received steams "ab" are subject to de-interleaving and constellation demapping in associated deinterleaver demapper modules 540, followed by multiplexing in multiplexer 542. The received data "ab" is decoded and descrambled in decoder descrambler 544.

The signals received at the four antenna 550 of station 566 exhibit known amounts of interference from the communications to station 546, which will be removed during the linear or non-linear equalization performed in equalizer 558. As a result in station 566 the received communications include contributions from both user's streams "abcd" on each of the four antenna. These contributions/interference remain after downconversion in Rf stage 552 and transformation from the time to the frequency domain in discrete Fourier Transform modules 554A-D from which these mixed streams are output as discrete orthogonal frequency division multiplexed (OFDM) tones/sub-carriers/sub-channels 536A-D each of which continues to exhibit such interference. All received streams are then subject to equalization in equalizer 538 implementing either linear or non-linear equalization which removes the cross user interference due to the novel post-equalization precoding of the current invention. At the output of the equalizer received steams "cd" are subject to de-interleaving and constellation demapping in associated deinterleaver demapper modules 560, followed by multiplexing in multiplexer 562. The received data "cd" is decoded and descrambled in decoder descrambler 564.

As shown in FIG. 5B the WAP 200 calculates the precode matrix used in the spatial mapper 510 using the entire contents of the responsive sounding packets, i.e. the "V"/matrix 570A, 570B and the SNR matrix 568A, 568B in the associated responsive sounding packets from stations 546, 566. The matrices received in each sounding packet are said to be fully-determined since the number of unknowns equals the number of equations. Thus instead of performing an SVD the WAP calculates the precode matrix by first determining the inner product of each channel matrix e.g. $H_{ab}{}^H H_{ab}$. This is obtained using the two matrices in the sounding packet as follows: matrix 582 which is the non Hermitian of the sounding response matrix 570A is multiplied by matrix 578 which is the Hermitian of the sounding response SNR matrix which is equivalent to $\Sigma^H$. This is in turn multiplied by matrix 574 which is the sounding response SNR matrix which is equivalent to $\Sigma$. Both matrices 578 and 574 have non-zero diagonal coefficients 580 and 576 respectively. The resultant matrix product is finally multiplied by matrix 572 which is the sounding response matrix 570A. This calculation is performed once for each user and the associated sounding packet in the MU group.

Once these inner products of each associated channel have been determined in this manner a similarity transform of all inner products is performed using "Q" as a transform matrix where Q is required to make selected non-diagonal elements of all inner products equal to zero, a.k.a. block diagonalizes the matrices 584A-B. In an embodiment of the invention block diagonalization results in making selected non-diagonal elements of all inner products equal to zero. Once Q is determined by for example minimizing a cost function associated therewith it is used to precode the associated streams of transmitted data in the spatial mapper 510 of the current invention.

Post-equalization precoding requires interference cancellation between users after equalization rather than at the receive antennas. As part of equalization the receiver will produce the following intermediate result:

$$WRx_1 = Q_1{}^+ H_1{}^+ Rx_1 = Q_1{}^+ H_1{}^+ H_1(Q_1 X_1 + Q_2 X_2 + Q_2 X_3)$$

$$WRx_2 = Q_2{}^+ H_2{}^+ Rx_2 = Q_2{}^+ H_2{}^+ H_2(Q_1 X_1 + Q_2 X_2 + Q_2 X_3)$$

$$WRx_3 = Q_3{}^+ H_3{}^+ Rx_3 = Q_3{}^+ H_3{}^+ H_3(Q_1 X_1 + Q_2 X_2 + Q_2 X_3) \tag{16}$$

The post-equalized signal for each user in the group, e.g. user 1, still contains interference contributions from users 2 and 3 (the terms proportional to $X_2$ and $X_3$). The new design criterion for $Q_i$ is to choose $Q_i$ such that these interference terms become zero.

This means:

$$Q_1{}^+ H_1{}^+ H_1 Q_2 = Q_1{}^+ H_1{}^+ H_1 Q_3 = 0$$

$$Q_2{}^+ H_2{}^+ H_2 Q_1 = Q_2{}^+ H_2{}^+ H_2 Q_3 = 0$$

$$Q_3{}^+ H_3{}^+ H_3 Q_1 = Q_3{}^+ H_3{}^+ H_3 Q_2 = 0 \tag{17}$$

So one way to express the difference between prior art pre-equalization precoding and the post-equalization precoding according to the current invention is to say that the criterion of removing interference has been moved from the received signal to the "post-equalized" signal.

In the sounding response packets delivered to the WAP by each station in the MU group, the WAP does not actually get the full channel matrices $H_i$. Instead, it gets the matrices $V_i$ and the equivalent of $\Sigma_i$ (with $H_i = U_i \Sigma_i V_i{}^+$). These two components ($V_i$ and $\Sigma_i$) are sufficient to build the matrices $H_i{}^+ H_i$. Indeed:

$$H_i{}^+ H_i = V_i \Sigma_i{}^+ U_i{}^+ U_i \Sigma_i V_i{}^+ \tag{18}$$

Since $U_i$ is a unitary matrix ($U_i^+U_i=1$), this becomes:

$$H_i^+H_i=V_i^+\Sigma_i^+\Sigma_iV_i^+ \quad (19)$$

I.e.: only $V_i$ and $\Sigma_i$ are needed to solve the equations (17).

Consider a two-use case where AP and STA both have the same number of antennas. At the transmitter, we wish to form a precoded signal that transmits two independent data streams in such a way that the interference at each of the two receivers is removed after equalization. The transmitted signal can be written as a linear combination of the data $X_1$ and $X_2$, intended for STA1 and STA2 respectively.

$$X=Q_1X_1+Q_2X_2 \quad (206)$$

With:

- $X_1$: an $N_{STS,1}\times 1$ vector of $N_{STS,1}$ data points intended for STA1
- $X_2$: an $N_{STS,2}\times 1$ vector of $N_{STS,2}$ data points intended for STA2
- $Q_1$: an $N_{TX}\times N_{STS,1}$ precoding matrix mapping the streams of the first user to the Tx antennas
- $Q_2$: an $N_{TX}\times N_{STS,2}$ precoding matrix mapping the streams of the second user to the Tx antennas
- X: an $N_{TX}\times 1$ vector representing the transmit signal at the antennas Note that this operation is performed on each data tone separately.

If we further denote the channel from the AP to STA1 as the $N_{RX}\times N_{TX}$ matrix $H^{(1)}$ and the channel from AP to STA2 as the $N_{RX}\times N_{TX}$ matrix $H^{(2)}$ (assuming here the same number of antennas ($N_{RX}$) at both stations), we can write the received signal per tone at STA1 and STA2 respectively as:

$$R^{(1)}=H^{(1)}Q_1X_1+H^{(1)}Q_2X_2+N^{(1)}$$

$$R^{(2)}=H^{(2)}Q_1X_1+H^{(2)}Q_2X_2+N^{(2)} \quad (21)$$

At each of the receiver, the received signal will then be equalized to recover the spatial streams from the signal observed at the antennas. This is implemented as a matrix multiplication with a matrix equalizer coefficient W that turns the $N_{RX}\times 1$ vector $R^{(i)}$ into an $N_{STS,1}\times 1$ vector which represents a noisy estimate of the transmitted data.

For instance, the signal at STA1 after equalization with equalizer coefficient W is given by:

$$\tilde{X}_1=WR^{(1)}=WH^{(1)}Q_1X_1+WH^{(1)}Q_2X_2+\tilde{N}^{(1)} \quad (22)$$

We now observe that, since W is an $N_{STS,1}\times N_{RX}$ matrix, the matrix product $WH^{(1)}$ that multiplies both $Q_1X_1$ and $Q_2X_2$ in (...) is an $N_{STS,1}\times N_{TX}$ matrix. Basic matrix theory tells us that such a matrix has at least $N_{TX}-N_{STS,1}$ zero modes. Since the precoding matrix $Q_2$ has dimension $N_{TX}\times N_{STS,2}$ and since $N_{STS,2}\leq N_{TX}-N_{STS,1}$, it should be possible to always chose a matrix $Q_2$ that falls entirely in the null space of $WH^{(1)}$. In other words: $WH^{(1)}Q_2=WH_2=0$ should always have a solution. In that case, any term proportional to $X_2$ will be exactly canceled after equalization.

If we can design $Q_1$ and $Q_2$ accordingly, we will have cancelled the interfering signal at each of the STAs, albeit only after equalization. As can be seen from (21), the received signal at the antennas still contains interference. However, since the demapping and bit decisions only happen after equalization, what really matters is the presence of interference at the equalizer output. As long as the interference is gone at this point, MU-MIMO can be used successfully.

Let's now denote:

$$H_1=H^{(1)}Q_1$$

$$H_2=H^{(1)}Q_2 \quad (23)$$

Finding the solution for the precoding matrices requires that we make some minimal assumptions about the equalization that will be used at the receiver. First of all, we assume that the STA has no explicit knowledge of the interference that is present and that it performs equalization strictly based on the channel measured for its own spatial streams. Popular equalization methods are zero forcing (ZF) and Minimum Mean Squared Error (MMSE).

If the STA1 uses ZF, its equalizer coefficient would be equal to:

$$W=(H_1^+H_1)^{-1}H_1^+ \quad (24)$$

If we assume that STA1 uses MMSE, its equalizer coefficient would be equal to:

$$W=(\sigma^2+H_1^+H_1)^{-1}H_1^+ \quad (25)$$

In both cases, the condition $WH_2=0$ can be met if:

$$H_1^+H_2=0 \quad (26)$$

In other words: the precoding has to be chosen such that $H_1$ and $H_2$ become orthogonal. Note that with $H_1^+H_2=0$, the maximum likelihood (ML) equalizer also becomes a de facto interference-free after equalization.

The ML equalizer will search for a value $\hat{X}_1$ such that the following metric is minimized:

$$|H_1\hat{X}_1-H_1X_1-H_2X_2-N|^2=|H_1\hat{X}_1-H_1X_1-N|^2+|H_2X_2|^2 \quad (77)$$

Since the second term in (77) is independent of $\hat{X}_1$, the effective metric is the same as for an ML equalizer of a signal for which the interference from the second user is completely removed. As such, the precoding condition is compatible with all popular equalizer types.

The orthogonality condition (26) can be expressed as:

$$Q_1^+H^{(1)^+}H^{(1)}Q_2=0$$

$$=Q_1^+V^{(1)}\Sigma^{(1)^2}V^{(1)^+}Q_2 \quad (28)$$

With:

$$H^{(i)}=U^{(i)}\Sigma^{(i)}V^{(i)^+} \quad (29)$$

Likewise, we require at STA2:

$$Q_2^+H^{(2)^+}H^{(2)}Q_1=0 \quad (30)$$

A compact way of summarizing the conditions is by forming a single matrix Q from $Q_1$ and $Q_2$:

$$Q=[Q_1Q_2] \quad (31)$$

Q is an $N_{TX}\times(N_{STS,1}+N_{STS,2})$ matrix.

With that, the conditions can be written as:

$$Q^+H^{(1)^+}H^{(1)}Q=\begin{pmatrix}A_{N_{STS.1}\times N_{STS.1}} & 0_{N_{STS.1}\times N_{STS.2}} \\ 0_{N_{STS.2}\times N_{STS.1}} & B_{N_{STS.2}\times N_{STS.2}}\end{pmatrix} \quad (32)$$

$$Q^+H^{(2)^+}H^{(2)}Q=\begin{pmatrix}C_{N_{STS.1}\times N_{STS.1}} & 0_{N_{STS.1}\times N_{STS.2}} \\ 0_{N_{STS.2}\times N_{STS.1}} & D_{N_{STS.2}\times N_{STS.2}}\end{pmatrix}$$

In other words: the precoding matrix Q has to be chosen such that it simultaneously block-diagonalizes $M_1=H^{(1)^+}H^{(1)}$ and $M_2=H^{(2)^+}H^{(2)}$. This will not always be possible, but in the cases where a solution exists, the desired precoding is achieved by using the columns of Q for the precoding of the user data. Note that the receivers are not expected to take special action, since their equalizer coefficients are the ones that would typically be used for equalization of a single-user signal.

There are several methods to obtain the precoding matrices $Q_i$, i=1, ..., $N_{user}$. One elegant approach is to formulate the problem as a joint (block-) diagonalization of multiple matrices as discussed above. The number of matrices that can be simultaneously diagonalized represents the number of users that can be precoded with perfect cancellation of the mutual interference.

In this formulation, the problem statement is to find a matrix Q such that for a given set of (Hermitian) matrices $M_i$, i=1, ..., $N_{user}$, all matrices $Q^+M_iQ$ are (block-) diagonal. The matrices $M_i$ can be formed from knowledge of the respective AP-STA channels.

Several matrices Q may meet the diagonalization requirement. It is beneficial to impose additional constraints to narrow down the solution space:

1. Although in general, Q will not be a unitary matrix (as would be the case for the diagonalization of a single Hermitian matrix), we additionally normalize the columns of Q to unit norm to keep the solution bounded
2. Although any block diagonalization will eliminate interference, it is beneficial to select the matrix Q that also maximizes the strength of the intended signal. In other words, we'd like the block $Q_i^+M_iQ_i$ to have the highest values in the block-diagonalized matrix $Q^++M_iQ$. This should ideally be true for all users.

A solution to the block-diagonalization problem can be found by defining a cost function that depends on the absolute values of the non-diagonal elements of all matrices $Q^+M_iQ$, i=1, ..., $N_{user}$. For instance:

$$\text{cost} = \sum_{i=1}^{N_{user}} \sum_{k=1}^{N_{STS,total}} \sum_{\substack{l=1 \\ k \neq l}}^{N_{STS,total}} |(Q^+M_iQ)_{kl}|^2 \quad (33)$$

The cost function minimizes selected non-diagonal elements of the transformed matrix for all users. The elements of Q are the free variables in the minimization problem. Whether a solution exists will depend on the number of users one tries to address (i.e. the number of matrices) and the dimensions of Q (i.e. the number of transmit antennas and the total number of streams in the MU transmission). When the number of free variables matches the total number of off-diagonal matrix elements, we typically find that a solution exists that makes the off-diagonal elements exactly zero. Note that diagonalization that makes off-diagonal elements exactly zero corresponds to a form of zero-forcing precoding. In some cases, there may not be a need to completely eliminate the interference. When other noises are present, reducing the interference to below the next dominant noise source may be sufficient. In that case, the diagonalization need not be perfect (i.e. non-diagonal elements could be non-zero as long as they're "small enough"). This could be achieved by assigning different weights to the terms in the cost function (33).

EXAMPLE 1

4×4 AP sending 2+2 *streams to two* 4×4 *STAs*

Consider a 4×4 AP and two 4×4 STAs. Let's say we want to find precoding coefficients $Q_1$ and $Q_2$ such that we can send 2 streams simultaneously to each of the STAs.

$H^{(1)}$ and $H^{(2)}$ are both 4×4 matrices. Q is also a 4×4 matrix. As an example, take:

$$H^{(1)+}H^{(1)} = \begin{bmatrix} 2.8634 & 1.3177 & -1.2858 & 0.8687 \\ 1.3177 & 1.3560 & -0.5705 & 1.8896 \\ -1.2858 & -0.5705 & 1.1471 & 0.6125 \\ 0.8687 & 1.8896 & 0.6125 & 7.7027 \end{bmatrix} \quad (34)$$

and $$H^{(2)+}H^{(2)} = \begin{bmatrix} 2.4203 & -2.3749 & 0.2968 & -2.3562 \\ -2.3749 & 12.4680 & -3.4157 & 2.5453 \\ 0.2968 & -3.4157 & 2.6060 & 0.1455 \\ -2.3562 & 2.5453 & 0.1455 & 2.8978 \end{bmatrix} \quad (35)$$

For this example, the following matrix Q can be found:

$$Q = \begin{bmatrix} 0.8217 & 0.2284 & 0.0322 & 0.5836 \\ -0.0145 & 0.1334 & -0.7964 & -0.4539 \\ -0.3899 & -0.4386 & -0.5565 & 0.6729 \\ 0.4153 & -0.8589 & 0.2345 & -0.0247 \end{bmatrix} \quad (36)$$

The columns of Q are each normalized to unity and they are mutually orthogonal for those columns that belong to the same user.

One can check that this precoding matrix meets the conditions for mutual cancellation of the interference after equalization, as given by (32):

$$Q^+H^{(1)+}H^{(1)}Q = \begin{bmatrix} 4.5950 & -1.5819 & 0 & 0 \\ 1.5819 & 6.1686 & 0 & 0 \\ 0 & 0 & 0.2621 & 0.0488 \\ 0 & 0 & 0.0488 & 0.4163 \end{bmatrix} \quad (37)$$

and:

$$Q^+H^{(2)+}H^{(2)}Q = \begin{bmatrix} 0.6747 & 1.2465 & 0 & 0 \\ 1.2465 & 3.6333 & 0 & 0 \\ 0 & 0 & 4.9360 & 5.0595 \\ 0 & 0 & 5.0595 & 8.2728 \end{bmatrix} \quad (38)$$

In this case, the matrix Q has 4 columns and is designed for 2 streams for STA1 and two streams for STA2. Other combinations may result in different values and different sizes of Q. However, the principle remains the same.

EXAMPLE 2

4×4 AP Sending 1+1+1 Streams to Three 4×4 STAs

In a second example, we consider a 4×4 AP sending MU transmissions to three 4×4 STAs simultaneously. Each of the STAs will receive a single stream. The channel from the AP to the various STAs are denoted as $H^{(1)}$, $H^{(2)}$ and $H^{(3)}$ respectively. All three channels are 4×4 matrices. As an example, let's take:

$$H^{(1)} = \begin{bmatrix} -1.1929 & 1.3713 & -0.9176 & -1.0266 \\ -0.5165 & -0.5949 & 1.2801 & -1.3386 \\ -0.0732 & -0.3984 & -0.3526 & -0.1319 \\ -0.1175 & -0.0262 & 0.0241 & 0.0241 \end{bmatrix} \quad (39)$$

-continued $$H^{(1)^\dagger} H^{(1)} = \begin{bmatrix} 1.7090 & -1.2964 & 0.4564 & 1.9163 \\ -1.2964 & 2.3938 & -1.8799 & -0.5610 \\ 0.4564 & -1.8799 & 2.6054 & -0.7231 \\ 1.9163 & -0.5610 & -0.7231 & 2.8695 \end{bmatrix}$$

$$H^{(2)} = \begin{bmatrix} -0.2366 & -0.3510 & 0.4835 & -4.0770 \\ 0.8477 & 2.7458 & 0.2144 & -0.2602 \\ -0.9900 & 0.3886 & -1.2063 & -0.1191 \\ 0.2617 & -0.0661 & -0.2324 & -0.0370 \end{bmatrix} \quad (40)$$

$$H^{(2)^\dagger} H^{(2)} = \begin{bmatrix} 1.8231 & 2.0086 & 1.2008 & 0.8523 \\ 2.0086 & 7.8177 & -0.0344 & 0.6729 \\ 1.2008 & -0.0344 & 1.7890 & -1.8747 \\ 0.8523 & 0.6729 & -1.8747 & 16.7052 \end{bmatrix}$$

$$H^{(3)} = \begin{bmatrix} -0.9549 & -0.9046 & -0.6482 & 2.3701 \\ 0.7154 & -0.0812 & -1.1612 & -0.0604 \\ -0.2582 & -0.7648 & -0.0838 & -0.4188 \\ -0.2083 & 0.1248 & -0.1333 & -0.0728 \end{bmatrix} \quad (41)$$

$$H^{(3)^\dagger} H^{(3)} = \begin{bmatrix} 1.5336 & 0.9772 & -0.1624 & -2.1831 \\ 0.9772 & 1.4255 & 0.7282 & -1.8279 \\ -0.1624 & 0.7282 & 1.7935 & -1.4215 \\ -2.1831 & -1.8279 & -1.4215 & 5.8018 \end{bmatrix}$$

Since the number of transmit antennas is 4 and we want to send a total of 3 streams, the precoding matrix Q will be a 4×3 matrix. By minimizing the appropriate cost function, we find:

$$Q = \begin{bmatrix} 0.8663 & 0.8122 & -0.7303 \\ -0.3824 & 0.8878 & 0.0553 \\ 0.5489 & 0.4528 & 1.0301 \\ 0.3801 & -0.1995 & 0.0006 \end{bmatrix} \quad (42)$$

It's easy to verify that Q meets the requirements (i.e. diagonalizes the three matrices $H^{(1)^\dagger} H^{(1)}$, $H^{(2)^\dagger} H^{(2)}$ and $H^{(3)^\dagger} H^{(3)}$):

$$Q^\dagger H^{(1)^\dagger} H^{(1)} Q = \begin{bmatrix} 6.0377 & 0 & 0 \\ 0 & 0.3256 & 0 \\ 0 & 0 & 2.8846 \end{bmatrix} \quad (43)$$

$$Q^\dagger H^{(2)^\dagger} H^{(2)} Q = \begin{bmatrix} 4.8727 & 0 & 0 \\ 0 & 11.9735 & 0 \\ 0 & 0 & 0.9186 \end{bmatrix} \quad (44)$$

$$Q^\dagger H^{(3)^\dagger} H^{(3)} Q = \begin{bmatrix} 0.1310 & 0 & 0 \\ 0 & 6.2215 & 0 \\ 0 & 0 & 2.9734 \end{bmatrix} \quad (45)$$

As discussed before, the orthogonality property ((43)-(45)) will cause any mutual interference to be eliminated after equalization.

Figure 6:
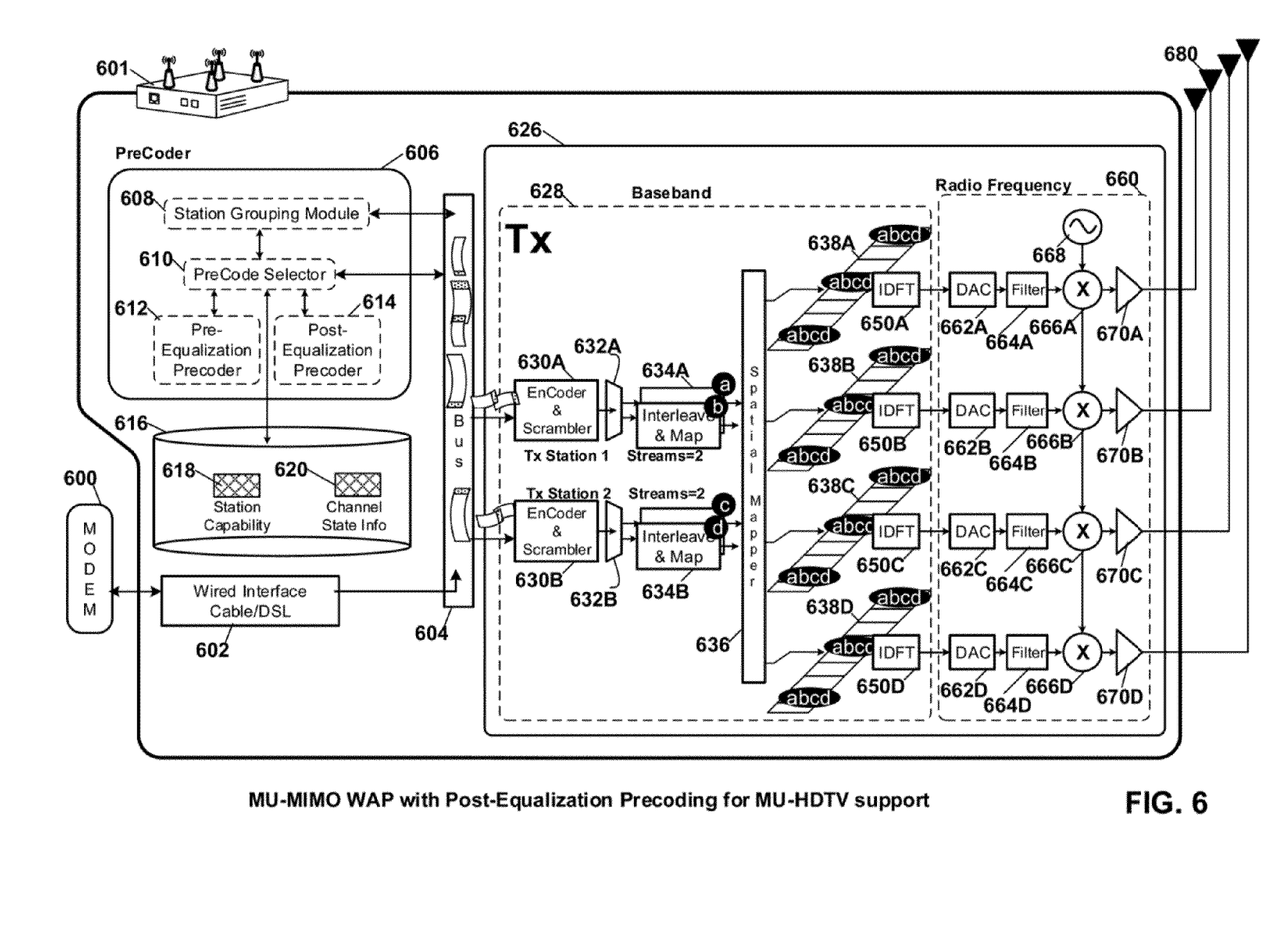
FIG. 6 is a hardware block diagram of a MU-MIMO WAP with expanded support for the types of stations which can be included in MU MIMO groups, in accordance with an embodiment of the invention.

FIG. 6 is a hardware block diagram of a MU-MIMO WAP with expanded support for the types of stations which can be included in MU MIMO groups, in accordance with an embodiment of the invention. Post-Equalization precoding is used to precode communications for MU groups in which the aggregate number of receive antennas in the devices/stations which are intended to form the multi-user group are greater than the number of transmit antennas on the WAP 500.

FIG. 6 shows WAP 601 in accordance with an embodiment of the invention. The WAP in this embodiment of the invention is identified as a 4×4 WAP supporting as many as 4 discrete communication streams over four antennas 680. It couples to the Internet via an integral wired interface 602 to a cable or digital subscriber line (DSL) modem 600. A packet bus 604 couples the modem to the MU-MIMO wireless stage 626. The wireless stage includes a baseband module 628 and a radio frequency module 660 coupled to antennas 680. In FIG. 6 only the transmit components of the baseband and Rf portions of the WAP are shown. The WAP however has a full and complementary set of receive path components and operates for transmitting and receiving communications from all associated wireless stations on its network.

In the baseband portion 628 communications for each user/station are processed. In the embodiment shown two pairs of streams are being processed for discrete MU delivery to two discrete stations/users. The baseband portion is dynamically configurable to support MU groups from 2-4 users/stations. The communications "a,b" to the $1^{st}$ of the two users are encoded and scrambled in encoder scrambler module 630A and de-multiplexed into two streams in demultiplexer 632A. Each stream "a, b" is subject to interleaving and constellation mapping in an associated interleaver mapper 634A and passed to the spatial mapper 636. Communications for the $2^{nd}$ user/station are encoded and scrambled in encoder scrambler module 630B and de-multiplexed into two streams in demultiplexer 632B. Each stream "c, d" is subject to interleaving and constellation mapping in an associated interleaver mapper 634B and passed to the spatial mapper 636. The spatial mapper in this embodiment of the invention supports either pre-equalization or post-equalization precoding as required based on the aggregate antenna count of the receive stations in any MU group in relation to the aforesaid four transmit antennas of the WAP. The combined precoded streams are injected into all OFDM tones 638A-D of the four inverse discrete Fourier Transform (IDFT) modules 650A-D respectively for Radio Frequency (Rf) upconversion in Rf stage 660 and for transmission by each of the WAP's four antenna 518.

The Rf stage includes 4 transmit chains each with their own digital-to-analog converter 662A-D, filter 664-D, upconverter 666A-D and power amplifier 670A-D. Each of the four transmit chains couples to a corresponding one of the WAP's four antenna. A common oscillator 668 drives the upconverters 668A-D.

The WAP 601 also includes a precoder controller 606 coupled to storage 616. The precoder controller includes: a station grouping module 608, a precode selector 610, a pre-equalization precoder 612 and a post equalization precoder 614. In operation the a station grouping module selects at least two of the associated station nodes for concurrent multi-user (MU) MIMO communication links with the WAP. The station grouping module initiates sounding and retrieving of responsive 'sounding' packets from each station/user in a MU group. The station grouping module stores the capabilities of each station 618 in memory 616 along with the associated channel state information 620. Once an MU group has been selected, the precode selector determines whether an aggregate number of receive antennas on the at least two station nodes selected by the grouping module exceeds in number the number of antenna on the WAP. Based on this determination, the precode selector chooses either the pre-equalization precoder 612 or the post-equalization precoder 614 to determine the precode matrix. If the aggregate number of antennas on the receivers of the MU group is less than or equal to the number of antennas on the WAP the pre-equalization precoder is selected to determine the precode matrix "Q". Alternately, if the aggregate number of antennas on the receivers of the MU group is greater than the number of antennas on the WAP the post-equalization precoder is selected to determine the precode matrix "Q".

If the pre-equalization decoder is selected it determines the precode matrix "Q" using a singular value decomposition (SVD) of "VH" matrix in each sounding packet to establish the null spaces between all users in the group and cancel interference there between at the receive antennas of each user in the group.

If the post-equalization decoder is selected it determines the precode matrix by determining the inner product of each user's channel matrix using the associated sounding response. Next, a similarity transform is performed on all inner products using "Q" as a transform matrix where "Q" block diagonalizes all channels for the users in the MU group. In an embodiment of the invention this process involves the iterative evaluation of a cost function such as that discussed above in connection with Equation 33 above. This post-equalization precode matrix results in known amounts of cross user interference at the receive antennas of each station in the MU group which is removed by the equalizer in each station whether via linear or non-linear equalization and without coordination with the transmitter.

Once the appropriate precode matrix "Q" is determined, it is passed to the spatial mapper 636 for precoding all concurrent transmissions to the selected station nodes in the MU group.

In an alternative embodiment of the invention post-equalization precoding is used for all MU Groups without regard for their aggregate antenna count.

FIG. 7 is a process flow diagram of processes associated with enhanced precoding in the MU MIMO WAP of an embodiment of the current invention. Processing begins in process 700 with a determination of device capabilities by the WAP for all stations in the network, via for example a capabilities exchange. This allows the WAP to identify numerous communication parameters for each station, including the number of streams supported by and antennas on each station as well as whether the station supports MU-MIMO soundings. Next in process 702 the WAP determines which if any stations to place in one or MU groups with each group including two or more stations/users/devices/nodes. Each group is then in process 704 analyzed to determine the required precoding mode, i.e. pre/post equalization precoding based on the aggregate number of receive antenna in the stations in an MU group versus the number of antenna on the WAP. Next in process 706 the WAP obtains sounding responses including the "$V^H$" and SNR matrices discussed above for all users in the next MU group.

Next, in decision process 708 a determination is made based on the aggregate number of receive antenna in the stations in an MU group versus the number of antenna on the WAP as determined in process 704, as to which form of precoding to utilize for determining the precode matrix "Q".

If the aggregate number of receive antenna is less than the number of antennas on the WAP then pre-equalization precoding is initiated in process 710. Next in process 712 the "$V^H$" matrix from each users sounding response is subject to a singular value decomposition (SVD). Then in process 714 the precode matrix "Q" is determined using a singular value decomposition (SVD) of "VH" matrix in each sounding packet to establish the null spaces between all users in the group and the corresponding columns of the precoding matrix. This matrix will cancel interference between users at the receive antennas of each user in the group. Control is then passed to process 730.

Alternately, if the aggregate number of receive antenna is greater than the number of antennas on the WAP then post-equalization precoding is initiated in process 720. Next in process 722 the inner product of each user's channel matrix is determined using the "$V^H$" matrix and SNR matrix from each users sounding response. Then in process 724, a similarity transform is performed on all inner products using "Q" as a transform matrix where "Q" block diagonalizes all channels for the users in the MU group. In an embodiment of the invention this process involves the iterative evaluation of a cost function such as that discussed above in connection with Equation 33 above. This post-equalization precode matrix results in known amounts of cross user interference at the receive antennas of each station in the MU group which is removed by the equalizer in each station whether via linear or non-linear equalization and without coordination with the transmitter. Control is then passed to process 730.

In process 730 the required precode matrix "Q" is passed to the spatial mapper. Then in process 732 the spatial mapper precodes transmissions for all user streams using the appropriate columns of the precode matrix "Q".

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless access point (WAP) apparatus having a plurality of antennas and supporting multiple-input multiple-output (MIMO) wireless communications with associated station nodes on a selected one of a plurality of orthogonal frequency division multiplexed (OFDM) communication channels; and the wireless access point apparatus comprising:

a station grouping module for selecting at least two of the associated station nodes for concurrent multi-user (MU) MIMO communication links with the WAP and for retrieving 'sounding' packets therefrom which characterize the associated communication channels there between;

a precode selector for determining whether an aggregate number of receive antennas on the at least two station nodes selected by the grouping module exceeds in number the plurality of antenna on the WAP;

a post-equalization precoder responsive to an affirmative determination by the precode selector to determine the inner products of the associated communication channels using the sounding packets and to perform a similarity transform of the inner products using 'Q' as a transform matrix where 'Q' block diagonalizes the associated communication channels; and a spatial mapper for precoding all concurrent transmissions to the selected at least two station nodes using "Q" as a precode matrix; thereby enhancing the communication capabilities of the WAP.

2. The WAP apparatus of claim 1, wherein the post-equalization precoder further block diagonalizes only selected non-diagonal elements of all inner products equal to zero.

3. The WAP apparatus of claim 1, wherein the post-equalization precoder further iteratively determines "Q" the precode matrix by evaluation of a cost function that minimizes selected non-diagonal elements of the transformed matrix for all associated station nodes.

4. The WAP apparatus of claim 1, further comprising:
a pre-equalization decoder responsive to a negative determination by the precode selector to determine the precode matrix "Q" using a singular value decomposition (SVD) of a channel indicia matrix "$V^H$" obtained from each user to establish the null spaces between all users in the group.

5. The WAP apparatus of claim 1, further comprising:
a pre-equalization decoder responsive to a negative determination by the precode selector to determine the precode matrix "Q" using a singular value decomposition (SVD) of a channel indicia matrix "$V^H$" obtained from each user to establish the null spaces between all users in the group, whereby cross user interference at each associated station node is substantially eliminated.

6. The WAP apparatus of claim 1, wherein an affirmative determination corresponds to a determination that the aggregate number of receive antennas exceeds in number the plurality of antenna on the WAP.

7. The WAP apparatus of claim 1, wherein a negative determination corresponds to a determination that the aggregate number of receive antennas does not exceed in number the plurality of antenna on the WAP.

8. The WAP apparatus of claim 1, wherein the "Q" matrix and determined by the post-equalization precoder results in both the presence of identifiable cross user interference at associated receive antennas of each associated station node together with an absence of cross user interference after equalization by each station node.

9. A method for operating a wireless access point (WAP) having a plurality of antennas and supporting multiple-input multiple-output (MIMO) wireless communications with associated station nodes on a selected one of a plurality of orthogonal frequency division multiplexed (OFDM) communication channels; and the method comprising:
selecting at least two of the associated station nodes for concurrent multi-user (MU) MIMO communication links with the WAP;
retrieving 'sounding' packets which characterize the associated communication channels from the station nodes selected in the selecting act;
determining whether an aggregate number of receive antennas on the at least two station nodes selected by the grouping module exceeds in number the plurality of antenna on the WAP;
performing a similarity transform of the inner products of the associated communication channels using 'Q' as a transform matrix where 'Q' block diagonalizes the associated communication channels, responsive to an affirmative determination in the determining act; and precoding all concurrent transmissions to the selected at least two station nodes using "Q" as a precode matrix; thereby enhancing the communication capabilities of the WAP.

10. The method for operating a WAP of claim 9 wherein the performing act further comprises:
performing a similarity transform of the inner products of the associated communication channels using 'Q' as a transform matrix where 'Q' block diagonalizes only selected non-diagonal elements of the associated communication channels, responsive to an affirmative determination in the determining act.

11. The method for operating a WAP of claim 9 wherein the performing act further comprises:
iteratively determining "Q" the precode matrix by evaluation of a cost function that minimizes selected non-diagonal elements of the transformed matrix for all associated station nodes.

12. The method for operating a WAP of claim 9 further comprising:
determining the precode matrix "Q" using a singular value decomposition (SVD) of a channel indicia matrix "$V^H$" obtained from each associated station node to establish the null spaces between all station nodes in the group; responsive to a negative determination in the determining act.

13. The method for operating a WAP of claim 9 further comprising:
determining the precode matrix "Q" using a singular value decomposition (SVD) of a channel indicia matrix "$V^H$" obtained from each associated station node to establish the null spaces between all station nodes in the group; responsive to a negative determination in the determining act, whereby cross node interference at each associated station node is substantially eliminated.

14. The method for operating a WAP of claim 9 wherein an affirmative determination in the determining act corresponds to a determination that the aggregate number of receive antennas exceeds in number the plurality of antenna on the WAP.

15. The method for operating a WAP of claim 9 wherein a negative determination in the determining act corresponds to a determination that the aggregate number of receive antennas does not exceed in number the plurality of antenna on the WAP.

16. The method for operating a WAP of claim 9 wherein the "Q" matrix in the performing act results in both the presence of identifiable cross node interference at associated receive antennas of each associated station node together with an absence of cross node interference after equalization by each station node.

17. A non-transient computer readable medium containing program instructions for causing a computer to perform the method of:
selecting at least two of the associated station nodes for concurrent multi-user (MU) MIMO communication links with the WAP;
retrieving 'sounding' packets which characterize the associated communication channels from the station nodes selected in the selecting act;
determining whether an aggregate number of receive antennas on the at least two station nodes selected by the grouping module exceeds in number the plurality of antenna on the WAP;
performing a similarity transform of the inner products of the associated communication channels using 'Q' as a transform matrix where 'Q' block diagonalizes the associated communication channels, responsive to an affirmative determination in the determining act; and precoding all concurrent transmissions to the selected at least two station nodes using "Q" as a precode matrix; thereby enhancing the communication capabilities of the WAP.

\* \* \* \* \*